Sept. 13, 1960

R. D. MOORE 2,952,787

MOTOR FOR CONTRA-ROTATING FANS

Filed Sept. 8, 1953

INVENTOR.
Robert D. Moore.
BY
Fishburn & Mullendore
ATTORNEYS.

Sept. 13, 1960 R. D. MOORE 2,952,787
MOTOR FOR CONTRA ROTATING FANS
Filed Sept. 8, 1953 3 Sheets-Sheet 2

INVENTOR.
Robert D. Moore.
BY
Fishburn & Mullendore
ATTORNEYS.

Sept. 13, 1960 R. D. MOORE 2,952,787
MOTOR FOR CONTRA ROTATING FANS
Filed Sept. 8, 1953 3 Sheets-Sheet 3
*Fig. 4A.* *Fig. 4.*
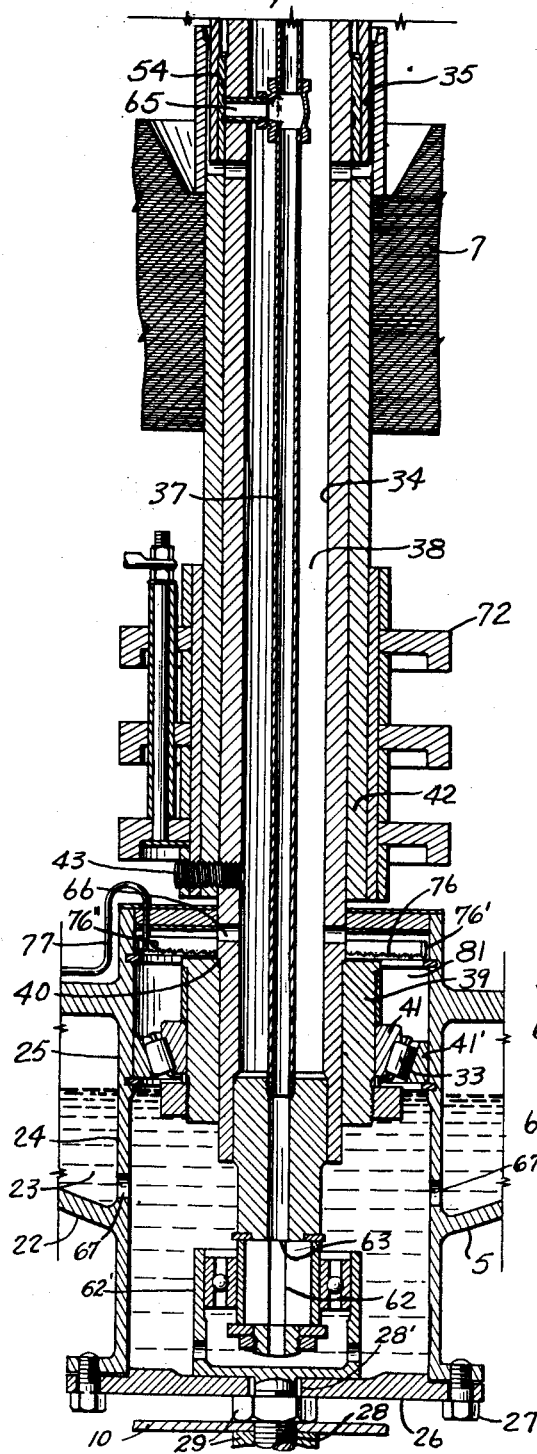
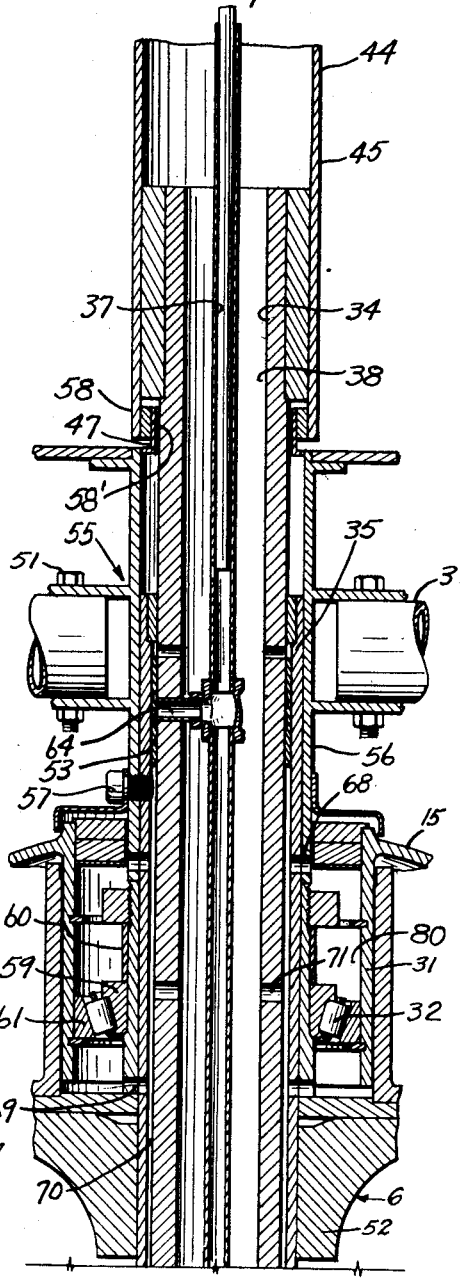
INVENTOR.
Robert D. Moore.
BY
Fishburn & Mullendore
ATTORNEYS.

United States Patent Office 2,952,787
Patented Sept. 13, 1960

2,952,787

MOTOR FOR CONTRA ROTATING FANS

Robert D. Moore, Marceline, Mo., assignor to Moore Company, Marceline, Mo., a corporation of Missouri Filed Sept. 8, 1953, Ser. No. 378,907

5 Claims. (Cl. 310—157)

This invention relates to motors for operating axial flow fans which provide forced movement of air and similar gases in a direction parallel to the fan axis. Fans of this character impart a rotational air velocity which reduces efficiency. The higher the pressure at a given r.p.m. and velocity, the greater will be the rotation of the discharge and greater the loss in power. Eventually the point is reached where axial flow breaks down entirely and the air rotates with the blades of the fan. In small fan units, it is practical to install guide vanes which turn the air counter to the deflection imparted by the blades of the fan, thereby straightening the flow and providing greater efficiency at higher pressures. But in larger fans and particularly in fans handling corrosive fluids, the cost of such guide vanes becomes prohibitive.

The present invention overcomes these difficulties by providing a motor for driving a plurality of contra-rotating fan wheels in tandem and arranged to operate the fan wheels in opposite directions so that the air rotated in one direction by the first fan wheel is reversed and straightened into a direct axial flow by the second fan wheel. This results in increased efficiency and lower power costs. It also makes practical the use of corrosive resistant metals in the parts exposed to corrosive fluids.

It is a further object of the invention to provide a direct drive for effecting contra-rotation of the respective fan wheels and thereby obtain greater aerodynamic efficiency with greater simplicity and lower cost.

Other objects of the invention are to provide a motor for driving a fan unit having a minimum of vibration and greater rigidity utilizing relatively small shaft diameters; to provide an arrangement of motor and fan wheel shafts adapted for effective lubrication of the various bearing surfaces; to provide the motor with a bearing arrangement and mounting for effectively resisting thrusts of the fan wheels; to provide a motor enclosure which is utilized for support of the fan unit; and to provide a fan construction in which it is feasible to utilize corrosive resistant materials.

In accomplishing these and other objects of the invention, as hereinafter pointed out, I have provided an improved structure, the preferred form of which is illustrated in the accompanying drawings wherein.

Figure 1:
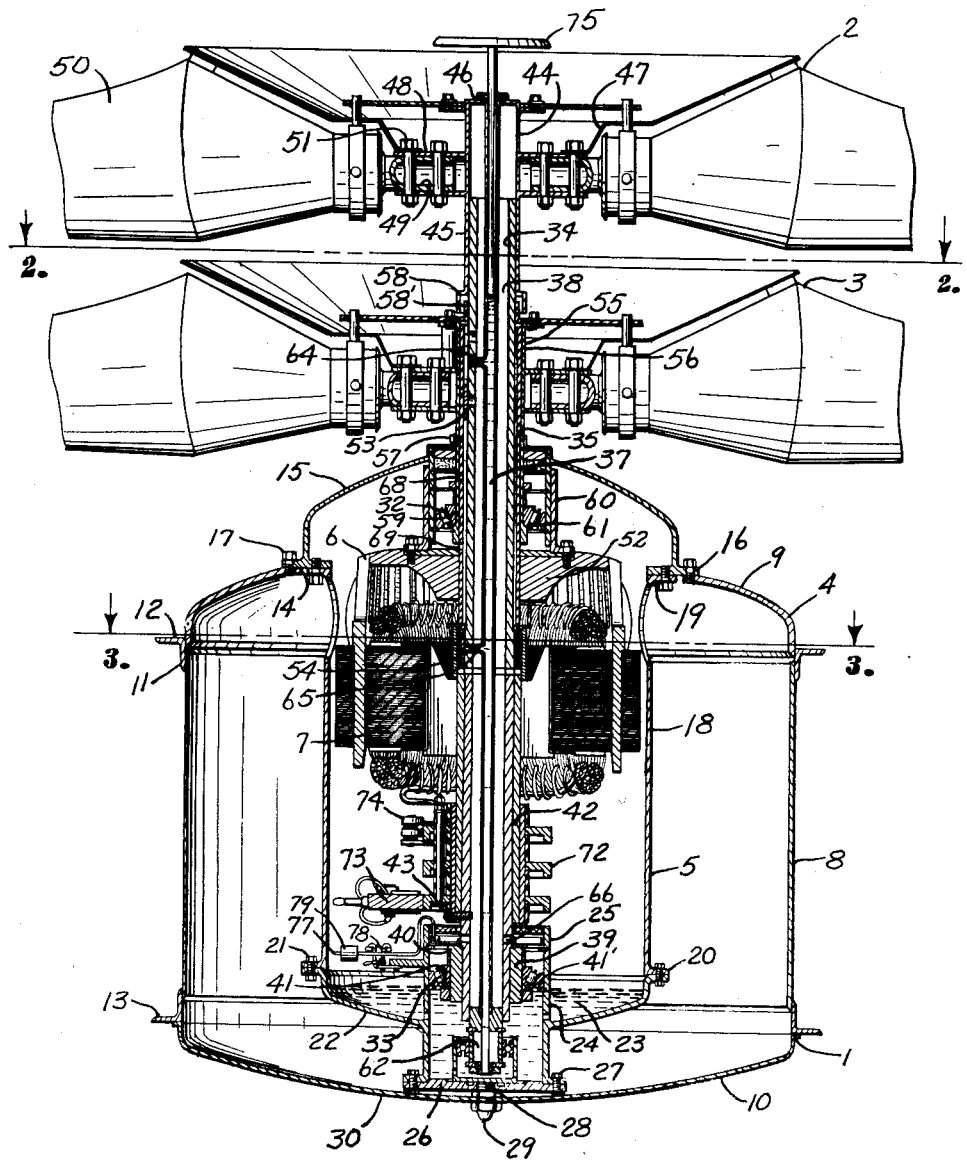
Fig. 1 is a longitudinal section through a fan unit equipped with a motor constructed in accordance with the present invention.
Figure 2:
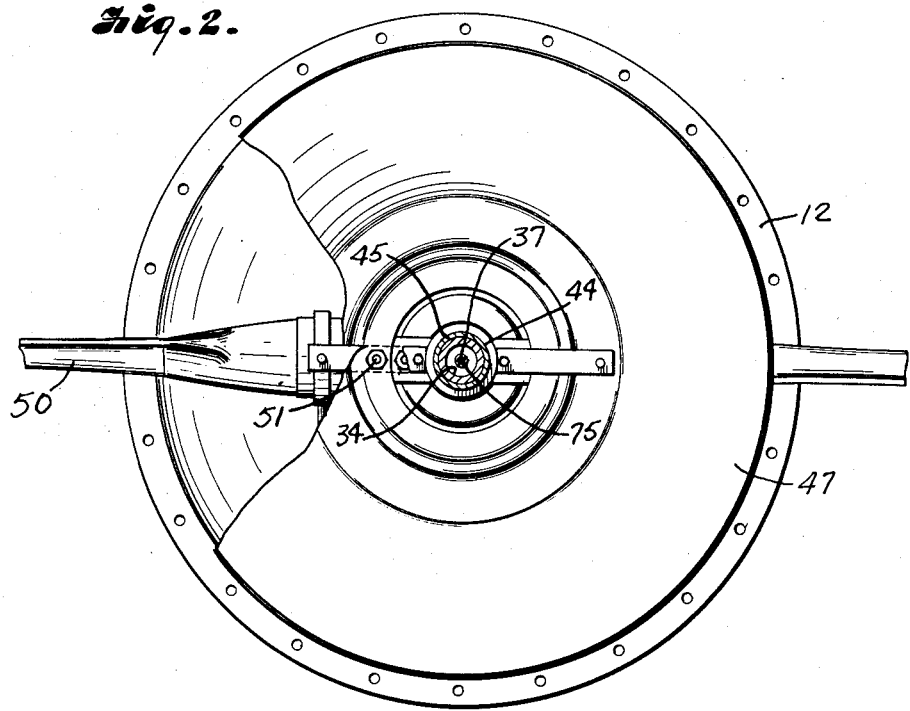
Fig. 2 is a cross section on the line 2—2 of Fig. 1.
Figure 3:
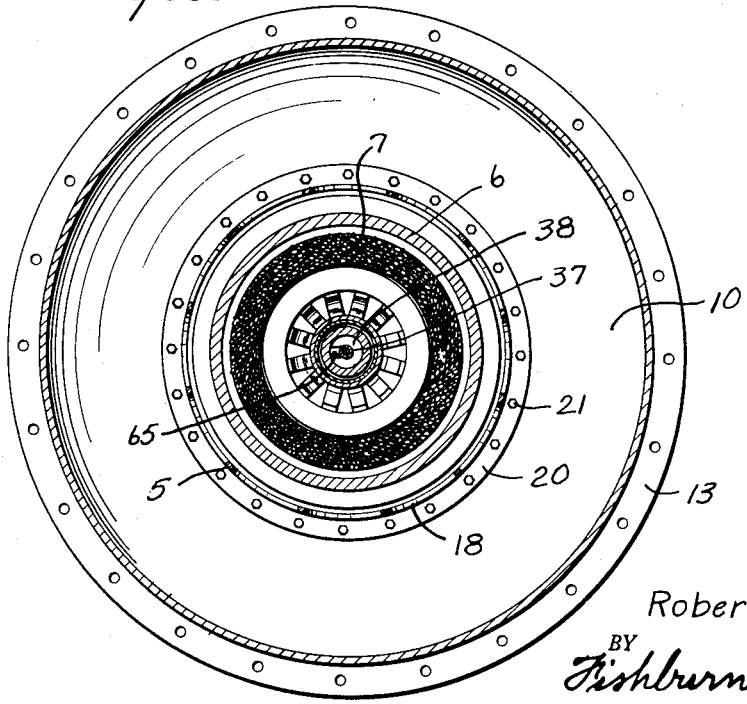
Fig. 3 is a cross section on the line 3—3 of Fig. 1.

Figs. 4 and 4-A are an enlarged fragmentary section through the central portion of the unit.

Referring more in detail to the drawings:

1 designates a fan unit and motor assembly constructed in accordance with the present invention and which includes contra-rotating fan wheels 2 and 3 that are carried on a stationary shell 4 which is adapted for support within an air or gas flow duct in any suitable manner. The shell 4 encloses an electrical motor housing 5 which contains contra-rotating elements or rotors 6 and 7 that are respectively connected with the fan wheels 2 and 3 as later described.

The stationery shell 4 preferably includes a cylindrical wall 8 closed at the ends by outwardly crowned heads 9 and 10. The upper head 9 is preferably connected to the upper ends of the wall 8 through a ring 11 having a laterally extending annular flange 12. The parts just described are preferably welded together to provide joints which exclude corrosive air or gases in which the unit may be operated. The lower head 10 is preferably removable from a similar ring 13 welded circumferentially of the lower end of the wall 8 as later described. The rings 11 and 13 may be used for attaching supporting elements (not shown) by which the fan unit is mounted coaxially within a flow duct or opening of a cooling tower or the like. The upper head 9 has an axial opening 14 that is closed by a dome shaped cover 15. The cover 15 has an annular flange 16 that is secured to the head 9 by fastening devices such as cap screws 17 to provide a tight joint and permit removal of the cover 15 for inspection and repair of the rotating elements 6 and 7 of the motor.

The motor housing 5 has a cylindrical wall 18 having flanged upper and lower ends 19 and 20 that are adapted to pass through the opening 14 when the parts are assembled.

Fixed to the lower flange 20 by suitable fastening devices such as bolts 21 is a closure 22 of concavo convex form to provide an oil reservoir 23 surrounding a bearing housing 24. The bearing housing 24 includes a cylindrical wall 25 that extends axially through the center of the closure 22 and the lower end thereof is closed by a plate 26 which is secured thereto by fastening devices 27.

The head, 10 of the outer shell is retained in position by connecting it with the closure plate 26. This is effected by providing the closure plate with an axial opening 28' through which a depending stud 28 extends and which also extends through a corresponding opening in the head 10. The stud carries nuts 29 on the end thereof to clamp the periphery 30 of the head 10 therebetween and in sealing contact with the flange of the lower ring 13. The cover 15 carries a depending housing 31 which forms an enclosure for a thrust bearing 32 which cooperates with a similar anti-friction thrust bearing 33 that is carried within the bearing housing 24 in forming the main journals for the fan wheel shafts and to resist the axial thrusts of the fan wheels incidental to operation thereof as later described.

The construction of the fan wheel shafts is an important feature in the present invention for making a contra-rotating fan unit practical since the shafts must be sufficiently strong and rigid to withstand the stress thereon and yet be of small enough diameter to accommodate practical sized antifriction bearings.

In the present invention the shaft 34 for the fan wheel 2 is a substantially extra heavy main support member of relatively small outer diameter to provide the support for a relatively thinner wall quill shaft 35 for driving the innermost fan wheel 3. The shaft 34 has its lower end journalled in the lower thrust bearing 33 and its upper end extends through the bearing housing 31 and projects from the cover 15 and quill shaft 35 a sufficient distance to mount the upper fan wheel 2 thereon.

In order to provide for lubrication of the various bearings, the main shaft 34 is hollow to accommodate an axial positioned lubricant supply pipe 37 and leave annular lubricant return passageway 38 for return of lubricant to the reservoir 23.

The lower end of the shaft 34 has a collar 39 that seats against a shoulder 40 thereon and forms a support for the inner race 41 of the thrust bearing 33, the outer race 41' of the bearing being suitably supported by the wall 25. The shaft 34 is reinforced by an outer sleeve 42 that extends from a point spaced from the collar 39 through the rotor 7 of the electric motor. The rotor 7 is pressed onto the upper end of the sleeve 42 so that turning of the rotor effects turning of the sleeve 42 and the main shaft 34 through a driving connection such as one or more screws 43 that connect the lower end of the sleeve with the shaft as shown in the drawing.

The upper end of the main shaft 34 mounts a hub 44 of the fan wheel 2. The hub 44 includes a substantially elongated relatively thin walled tube 45 that may be formed of corrosive resistant metal. The upper end of the tube is closed by a cap 46 that connects with a disk 47 which closes the space surrounding the hub of the upper fan wheel. The hub also includes radially extending sockets 48 for receiving shanks 49 of fan blades 50, the shanks being secured in the sockets by fastening devices such as bolts 51 that extend diametrically through the parts as shown in Fig. 1.

The quill shaft 35 is rotatable about the main shaft 34 intermediate the sleeve 42 and the lower terminal of the hub 44 to connect the hub 52 of the rotor 6 with the fan wheel 3. The quill shaft 35 has a larger inner diameter than the outer diameter of the main shaft 34 to provide a space therebetween for receiving bearing sleeves 53 and 54 that may be pressed within the quill shaft 35 for bearing contact with the main shaft 34. The hub 55 of the fan wheel 3 conforms with the fan wheel 2 and the tube portion 56 also encases the portion of the quill shaft that projects from the cover 15 of the stationary shell 4.

The tube 56 is connected with the quill shaft to effect a driving connection therebetween by means of a screw 57. The hub tube 45 of the fan wheel 2 has a skirt portion 58 which cooperates with an upper extension 58' of the hub tube 56 to form a rotating seal therebetween.

The motor parts in the present illustration conform with the corresponding parts of the motor disclosed in Patent No. 2,596,783, issued to me May 15, 1952. However, in the present instance both motor rotors 6 and 7 are left free to rotate, with one rotor rotating reversely to the other to drive the fan wheels 2 and 3 in reverse or contra-directions.

The hub tube 56 of the fan wheel 3 is a sufficient length to extend within the upper bearing housing so as to carry the inner race 59 of the bearing 32 in supporting the fan wheel 3 against axial thrust produced incidental to operation thereof, a collar 60 being provided on the lower end of the quill to seat the inner race. The outer race 61 is suitably fixed in the bearing housing 31 against axial thrusts.

Mounted within the sump of the lower bearing housing is a pump 62 having a driving connection as at 63 with the lower end of the main shaft 34 to pump oil from the sump upwardly through the pipe 37 for discharge to the sleeve bearings 53 and 54 through branch outlets 64 and 65 as shown in Fig. 1. The oil on passing through the bearing sleeves 64 and 65 returns through the passageway 38 and is discharged onto a filter screen 76 that covers the upper end of the lower bearing housing, the oil being admitted onto the filter screen through ports 66 in the main shaft. The oil, after passing through the filter screen, is discharged into the reservoir 23 and returned to the sump through ports 67 in the wall 25 of the bearing housing.

The lower thrust bearing 33 is lubricated directly by the oil contained in the sump, however, the upper thrust bearing 32 is lubricated by the circulated oil carried to the upper bearing sleeve 53, a portion of which passes between the main shaft 34 and the quill shaft 35 by way of ports 68 into the housing for the upper thrust bearing. The oil is returned from the upper bearing housing 31 through ports 69 that connect with an annular passageway 70 from where the oil is returned to the main shaft through ports 71.

The collector rings 72 for the motor are mounted for rotation with the main shaft which is turned by the rotor 7 and the brushes 73 may be suitably mounted in stationary position by suitable supports 74 within the shell 5 of the motor housing.

Pressure is maintained on the oil by a plunger 75 which extends into the oil supply pipe 37 and serves as a visual indicator of the pressure as the plunger is lifted by the pump pressure. The pump 62 is contained in a bearing housing 62' that carries the stud 28 previously referred to.

An automatic cut-off is provided in case of oil failure. The filter screen 76 forms the bottom of a pan 76' which is movably mounted on a cross pin 76'' to support the pan just above the lower thrust bearing. A lever arm 77 is attached to the pan 76' and mounts a mercury switch 78 that is connected in series with the holding coil of the starter solenoid (not shown) for the electric motor. With the oil flowing, the pan is kept full and the mercury switch is closed but, should the oil cease, the oil leaks through the screen 76 of the pan 76' whereupon a weight 79 on the lever 77 overbalances the pan. This trips the mercury switch and breaks the holding coil circuit.

In operation, closure of the motor circuit energizes the motor windings to cause the rotor 6 to rotate counter to the rotor 7 so that the main shaft is driven in one direction to turn the fan wheel 2 and the quill shaft is rotated in opposite direction to turn the fan wheel 3. Operation of the main shaft drives the pump 62 to elevate the oil from the oil sump of the lower bearing housing. The oil acts against the rod 75 to create a pressure for forcing the oil through the outlets supplying the sleeve bearings 53 and 54. Part of the oil supplied to the upper sleeve bearing gravitates to the upper bearing housing for maintaining a supply of lubricant for the upper thrust bearing 32. Excess oil is returned from the respective bearings through the oil return passageway for discharge into the pan 76'. The oil seeps through the perforations of the pan 76' and returns to the oil reservoir 23 which supplies the oil to the sump of the lower bearing housing. As long as there is oil contained within the perforated pan, the motor circuit is closed and the fan continues to operate, however, in case of oil failure, the weight 79 overbalances the weight of the pan and actuates the mercury switch 78 to effect opening of the motor circuit through a holding coil circuit as above described.

Rotational velocities set up through rotation of one of the fan wheels is counteracted by contact with the other fan wheel so that the air discharge is maintained in a straightway direction parallel with the axis of the fan wheels.

It is obvious that thrust of the fan wheel 2 is carried by the lower thrust bearing 33 and that of the fan wheel 3 is carried by the upper thrust bearing 32. Each of the thrust bearings has its own individual oil well to assure adequate supply of lubrication to these bearings and no oil seals are necessary. The particular mounting of the thrust bearings requires no adjustment to maintain proper operation of the fan wheels. The thinness of the sleeve bearings 53 and 54 allow use of a relatively large inner or main shaft.

The oil pump is of a type capable of operation in either direction so that the direction of the fan blades may be reversed to change the direction of air discharge, for example, when the fan is installed on a cooling tower and it becomes necessary to de-ice the intake louvers of the tower.

It is obvious that the unit is so designed that the entire motor assembly may be lifted out of the shell 4 upon removal of the dome cover 15 or, if desired, the various motor parts may be easily accessible by dropping the bottom head 10 of the outer shell and removing the closure 22.

The construction of the unit is substantially gas tight to exclude moisture and corrosive vapors. The structure also provides for relatively inexpensive shielding of the corrosive parts by non-corrosive metal from which the fan hubs and other exposed fan parts may be constructed.

While the present drawings and description relate to a vertical type fan, the fan may be used in horizontal position by use of an additional set of anti-friction bearings in the bearing housings, the bearing housings having been illustrated of sufficient depth to accommodate such bearings in the spaces 80 and 81 (see Figs. 4 and 4A).

What I claim and desire to secure by Letters Patent is:

1. An apparatus of the character described, including a shell forming a stationary support and having a lubricant supply, an electric motor enclosed in the shell and having contra rotating field and armature rotors, axially aligned thrust bearings mounted in the shell at opposite ends of the motor, a tubular main shaft carrying one of the rotors and having one end journaled in one thrust bearing with the other end extending coaxially through the other thrust bearing and projecting from the shell, a quill shaft carrying the other rotor and coaxially mounted relatively to the main shaft, for journaled support in said other thrust bearing with one end projecting from the shell, the only driving connection between the quill and main shafts being that established through electromotive force established between the field and armature rotors, and said thrust bearings and the shell restricting relative axial movement of the main and quill shafts, bearings journaling the quill shaft upon the tubular main shaft above and below the said other thrust bearing, and means including a duct extending upwardly through the tubular main shaft and having outlet to said bearings which journal the quill shaft for circulating lubricant from the lubricant supply in the shell said quill shaft having ports for passing the lubricant to the said other thrust bearing and said tubular main shaft having ports for returning lubricant through the tubular main shaft to said one thrust bearing.

2. An apparatus of the character described, including a shell forming a stationary support, an electric motor enclosed in the shell and having contra rotating field and armature rotors, axially aligned thrust bearings mounted in the shell at opposite ends of the motor, a main shaft carrying one of the rotors and having one end journaled in one thrust bearing with the other end extending coaxially through the other thrust bearing and projecting from the shell, a quill shaft carrying the other rotor and coaxially mounted relatively to the main shaft for journaled support in said other thrust bearing and having one end projecting from the shell, spaced apart bearing sleeves intermediate the quill and main shafts to cooperate with the thrust bearings for maintaining axial alignment and independent rotation of said shafts and to provide a lubricant duct between said shafts having connections with said other thrust bearing, and means including a pump driven by one of the said shafts and having a connection with the pump for supplying lubricant to the sleeve bearings and to said thrust bearings by way of the duct between said shafts through ports in said shafts.

3. In an apparatus of the character described, a shell, coaxial bearing housings at upper and lower ends of the shell, a motor enclosed in the shell and having contra rotatable rotors, thrust bearings mounted in the bearing housings, a tubular main shaft carrying one of the rotors and having one end journaled in the lower thrust bearing with the other end extending through the upper thrust bearing and projecting from the shell, a quill shaft carrying the other rotor and coaxially mounted relatively to the tubular main shaft and journaled in the upper thrust bearing with an end projecting from the shell, spaced apart bearing sleeves intermediate the quill and main shafts, said main shaft forming a lubricant return duct and housing a lubricant supply duct having connection with said bearings, said lower bearing housing forming a lubricant sump in connection with a lubricant reservoir in the lower portion of the shell, a lubricant pump in said sump and having a driven connection with the main shaft and a discharge connection with the lubricant supply duct for pumping lubricant from the sump to said bearings for return through the tubular main shaft to said reservoir, and means movable in the upper end of the lubricant supply duct and cooperating with the pump for maintaining pressure on the lubricant discharge to the bearing sleeves.

4. In an apparatus of the character described, a shell, coaxial bearing housings at upper and lower ends of the shell, a motor enclosed in the shell and having contra rotatable rotors, thrust bearings mounted in the bearing housings, a main shaft carrying one of the rotors and having one end journaled in the lower thrust bearing with the other end extending through the upper thrust bearing and projecting from the shell, a quill shaft carrying the other rotor and coaxially mounted relatively to the main shaft and journaled in the upper thrust bearing for projection from the shell, spaced apart bearings intermediate the quill and main shafts, said main shaft having lubricant supply and return ducts connected with said spaced apart bearings, said lower bearing housing forming a lubricant sump in connection with a lubricant reservoir in the lower portion of the shell, a lubricant pump in said sump and having driven connection with the main shaft and a discharge in connection with the lubricant supply duct for pumping lubricant from the sump through the lubricant supply duct for return to the reservoir, a flow control means ahead of the reservoir for controlling return of lubricant to said reservoir, and means for stopping the motor responsive to absence of lubricant in said control means.

5. An apparatus of the character described, including a shell forming a stationary support, a motor enclosed in the shell and having contra rotating rotors, axially aligned thrust bearings mounted in the shell at opposite ends of the motor, a tubular main shaft carrying one of the rotors and having one end journaled in one thrust bearing with the other end extending through the other thrust bearing and projecting from the shell, a quill shaft carrying the other rotor and coaxially mounted relatively to the tubular main shaft for journaled support in said other thrust bearing for projection from the shell, and spaced apart bearing sleeves intermediate the quill and main shafts and cooperating with the thrust bearing which journals the quill shaft to maintain alignment of said shafts with respect to the thrust bearing journaling said one end of the main tubular shaft, said tubular main shaft forming a lubricant return duct and containing a lubricant supply duct extending longitudinally within the tubular main shaft and having branch outlets to the bearing sleeves for supplying lubrication thereto, said quill shaft having duct means connecting the lubricant supplied through at least one of the sleeve bearings for supplying lubricant to the thrust bearing journaling the quill shaft, said shell having a sump for containing lubricant for lubricating the other thrust bearing and having a lubricant reservoir supplying said sump, a pump in the sump having driven connection with the tubular main shaft and having a discharge connection with the lubricant supply duct to circulate the lubricant to said bearings, and said tubular main shaft having an opening connected with the reservoir to return lubricant to the lubricant reservoir.

References Cited in the file of this patent

UNITED STATES PATENTS

| | | | |
|---|---|---|---|
| 1,351,999 | Heath | Sept. 7, | 1920 |
| 1,856,587 | Persons | May 3, | 1932 |
| 1,861,608 | Persons | June 7, | 1932 |
| 2,121,073 | De Bothezat | June 21, | 1938 |
| 2,285,592 | Ledwinka | June 9, | 1942 |
| 2,429,061 | Hunter | Oct. 14, | 1947 |
| 2,457,999 | Hulbert | Jan. 4, | 1949 |
| 2,461,076 | Neeson | Feb. 8, | 1949 |
| 2,462,182 | Guerdon et al. | Feb. 22, | 1949 |
| 2,556,435 | Moehrl et al. | June 12, | 1951 |

FOREIGN PATENTS

| | | | |
|---|---|---|---|
| 2,557 | Great Britain | of | 1893 |
| 155,550 | Great Britain | of | 1922 |
| 751,421 | France | June 19, | 1933 |
| 760,095 | France | Dec. 6, | 1933 |
| 349,680 | Italy | June 18, | 1937 |
| 874,500 | Germany | Apr. 23, | 1953 |